United States Patent [19]

Bloom et al.

[11] 3,885,990

[45] May 27, 1975

[54] GALVANIC CELL

[75] Inventors: Stanley M. Bloom, Waban; Arnold Hoffman, Brookline, both of Mass.

[73] Assignee: Polaroid Corporation, Cambridge, Mass.

[22] Filed: Nov. 9, 1973

[21] Appl. No.: 414,511

[52] U.S. Cl. ............... 136/102; 136/103; 136/155
[51] Int. Cl. ........................................... H01m 17/00
[58] Field of Search ........... 136/103, 107, 111, 102, 136/138, 155, 6 L, 154

[56] References Cited
UNITED STATES PATENTS

| 2,480,839 | 9/1949 | Daniel | 136/107 |
| 3,000,997 | 9/1961 | Trigg | 136/107 |
| 3,096,217 | 7/1963 | Clune | 136/107 |
| 3,098,771 | 7/1963 | Huber | 136/103 |
| 3,468,708 | 9/1969 | Davis et al. | 136/6 L |

Primary Examiner—Anthony Skapars
Attorney, Agent, or Firm—Philip G. Kiely

[57] ABSTRACT

A galvanic cell having a zinc anode which includes a source of mercury ion which will provide a relatively continuous source of said ion over an extended period of time for amalgamation with the zinc anode.

6 Claims, No Drawings

GALVANIC CELL

BACKGROUND OF THE INVENTION

Primary and secondary cells have a loss of capacity or storing because of a self-discharge and dissolution of the metal electrodes. Thus, more specifically, the shelf life of a cell employing a zinc anode, such as a Leclanche system, is limited by, among other factors, the open circuit corrosion of the zinc anode which causes dissolution of the metallic zinc and discharge of hydrogen gas.

To avoid the corrosion of the zinc, a variety of corrosion inhibitors have been added to the electrolyte. One of the oldest and most effective corrosion inhibition techniques has involved the amalgamation of the zinc by mercury. While a pre-amalgamation treatment of the zinc may be carried out, it is more conventional to apply mercuric chloride to the zinc as a component of the electrolyte.

Flat or planar batteries of the general type disclosed, for example, in U.S. Pat. Nos. 3,563,805; 3,617,387; 3,734,780; and the like, comprise superposed planar anode/cathode combinations possessing a separator disposed intermediate each anode and cathode and electrolyte disposed on or impregnated in the separator and in contact with respective facing surfaces of the anode and cathode.

Planar batteries of the type disclosed in the aforementioned U.S. patents are generally intended to be employed as a individual power source for portable electrically operated devices wherein the selected device design parameters are optimized by the availability and employment of a planar battery exhibiting reliability with respect to its power delivery characteristics. Batteries of the type in question presently are employed commercially to operate the various electrically powered systems of the photographic camera sold by Polaroid Corporation, Cambridge, Massachusetts, U.S.A., under the trademark "SX-70." In such cameras, the battery, disposed as a component of a film pack for employment in and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions to deliver the required series of high current pulses dictated by the photographic system design.

Particular problems of amalgamation are presented with the above-described flat, planar batteries. Generally, powdered zinc is employed as the anode, which contains a relatively large amount, e.g., 5 percent or more, of zinc oxide and which presents a large surface area to the electrolyte. Subsequent to amalgamation and in contact with the electrolyte, the zinc oxide slowly dissolves providing fresh, unamalgamated zinc surfaces which result in increased hydrogen gas generation and attendant increase in impedance and general deterioration of the battery. Also, if less than full surface coverage by electrolyte occurs initially upon assembly subsequent redistribution of mercury-ion depleted electrolyte will also result in inadequately amalgamated zinc surfaces.

A novel galvanic cell and method for preparing said cell have now been found which are not susceptible to the deficiencies of the prior art.

SUMMARY OF THE INVENTION

The present invention is directed to a galvanic cell having a zinc anode wherein amalgamation of the zinc anode is provided at least in part by disposing a relatively insoluble mercury compound or mercury ion complex into the electrolyte to provide a relatively continuous source of mercury ions to the zinc as required, to minimize corrosion of unamalgamated zinc. The described mercury compound may provide the sole source of mercury for amalgamation or may be used in conjunction with conventional sources of mercury.

For convenience, the term "compound" as used herein will include complexes as well.

DETAILED DESCRIPTION OF THE INVENTION

The present invention is directed to the attenuation of corrosion of zinc anodes by providing a substantially continuous supply of mercury ions to amalgamate the zinc as fresh, i.e., unamalgamated zinc surfaces become exposed.

The objects of the present invention are achieved by disposing in the electrolyte a source of oxidized mercury which sources may comprise relatively insoluble salts, complexes and the like. The mechanism may be represented as follows:

$$(HgL)^{+n} \rightleftharpoons Hg^+ + L$$

wherein L is a ligand or anion and as $Hg^+$ ions are amalgamated with zinc new $Hg^+$ ions would be produced to maintain the equilibrium.

The present invention contemplates the employment of both mercurous and mercuric ions for amalgamation. The term "mercury ion" as used herein is intended to include both valence states. As examples of suitable sources of mercury ions, mention may be made of the following relatively insoluble compounds and complexes:

mercurous sulfate
mercurous acetate
mercurous chloride
mercurous bromide
mercurous iodide
$Hg(NH_3)_2X_2$ (wherein X is halogen)
$[Hg(NH_3)_4](NO_3)_2$
$Hg_2[(P_2O_7)_2]^{6-}$
$Hg_2[(P_2O_7)(OH)]^{3-}$ As stated above, the present invention contemplates the use of the relatively insoluble source alone or in combination with a conventional method of amalgamation. For example, the source of mercury ion well known to the art, mercuric chloride, and relatively insoluble mercurous chloride may both be disposed in the electrolyte to provide relatively rapid amalgamation by conventional means, and at the same time insure the availability of mercurous ions for the amalgamation of new zinc surfaces which are not initially exposed.

The novel method of the present invention is particularly suitable for use with anodes prepared from zinc dust. Such anodes, which are widely used in flat, planar batteries as described above, are particularly susceptible to corrosion because of the large surface area and because of the relatively high amount of zinc oxide present. It will also be readily recognized that the present invention is particularly useful in batteries which may be stored for relatively long periods of time before use. Deterioration of the battery due to corrosion is reduced, thus enhancing the reliability of the stored batteries.

The following non-limiting example illustrates the novel cells of the present invention.

EXAMPLE

Cells were assembled employing a powdered zinc anode, a manganese dioxide-carbon slurry cathode (about 12 square inches each) and an electrolyte designated below.

The following table shows the electrolyte employed and the open circuit voltage (OCV) and the closed circuit voltage (CCV). The load resistance in all cases was 0.83 ohms and the CCV was measured 1 sec. after load was imposed.

| Electrolyte | OCV | CCV |
| --- | --- | --- |
| Control | 1.6 | 1.35 |
|   22 g. ammonium chloride | | |
|   10 g. zinc chloride | | |
|   2 g. mercuric chloride | | |
|   2 g. hydroxyethyl cellulose | | |
|   66 g. water | | |
| Example 1 | 1.63 | 1.28 |
|   22 g. ammonium chloride | | |
|   10 g. zinc chloride | | |
|   1.5 g. mercurous chloride | | |
|   2 g. hydroxyethyl cellulose | | |
|   67 g. water | | |
| Example 2 | 1.45 | 1.19 |
|   22 g. ammonium chloride | | |
|   10 g. zinc chloride | | |
|   1.5 g. mercurous chloride | | |
|   2 g. mercuric chloride | | |
|   2 g. hydroxyethyl cellulose | | |
|   67 g. water | | |

While the invention is described primarily in terms of a Leclanche battery, it should be understood that the novel amalgamation system of the present invention may be employed in either primary or secondary batteries. The electrolyte employed is not critical and is intended to include alkaline and acidic electrolytes.

Since certain changes may be made in the above product without departing from the scope of the invention herein involved, it is intended that all matter contained in the above description shall be interpreted as illustrative and not in a limiting sense.

What is claimed is:

1. A galvanic cell comprising a zinc anode, a cathode and an aqueous electrolyte wherein the electrolyte includes a relatively insoluble mercurous compound which is substantially less soluble than mercuric chloride.

2. The product as defined in claim 1 wherein said cathode is manganese dioxide/carbon black and said electrolyte is ammonium chloride/zinc chloride.

3. The product as defined in claim 1 wherein said electrolyte is an aqueous alkaline solution.

4. The product as defined in claim 1 wherein said mercury compound is mercurous chloride.

5. The product as defined in claim 4 wherein said electrolyte includes mercuric chloride.

6. The product as defined in claim 1 wherein said anode is powdered zinc.

* * * * *